April 2, 1929.  W. EHRHART  1,707,786
PRETZEL COOKING APPARATUS
Filed Nov. 24, 1925  2 Sheets-Sheet 1
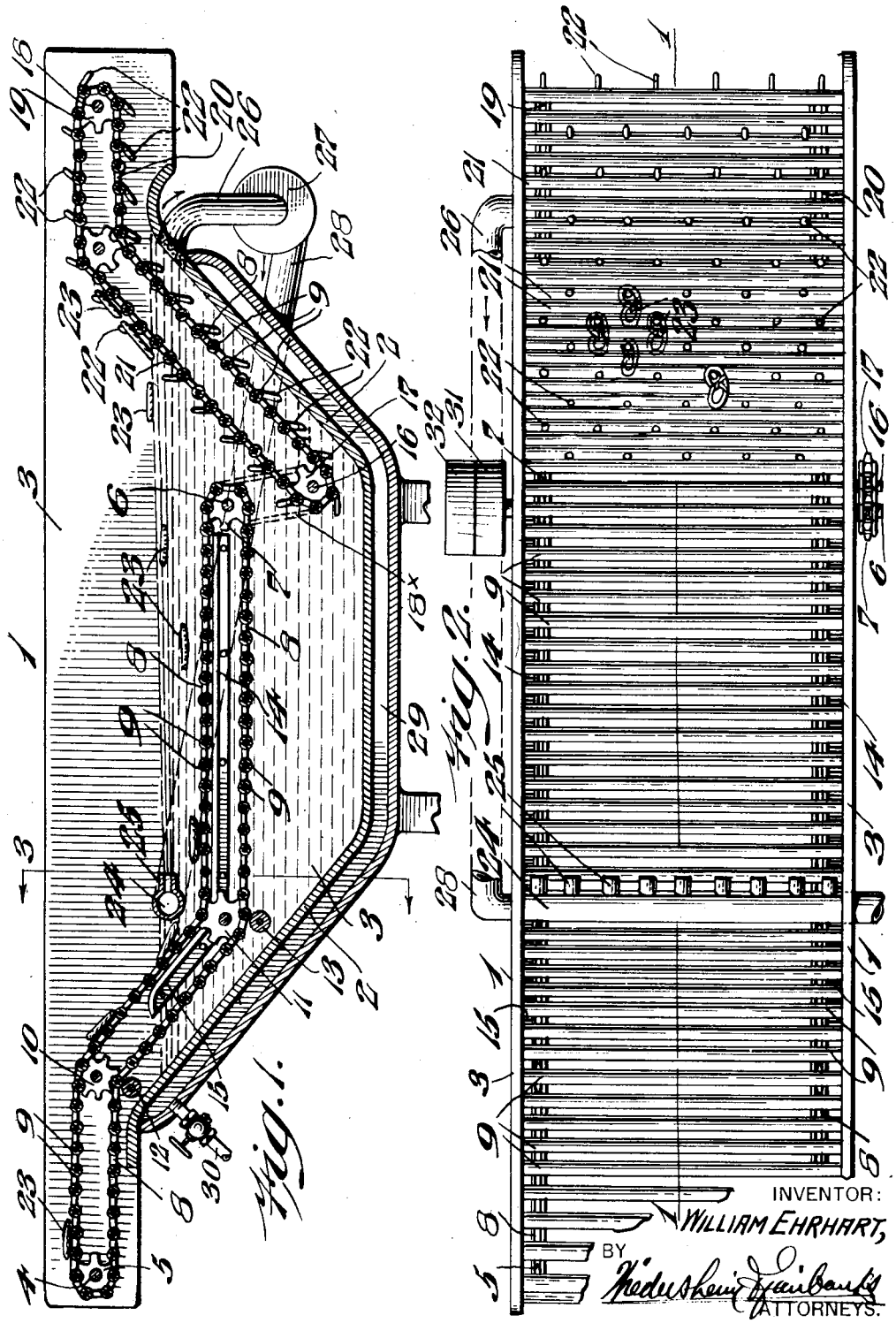
INVENTOR:
WILLIAM EHRHART,
BY
ATTORNEYS.

April 2, 1929.  W. EHRHART  1,707,786
PRETZEL COOKING APPARATUS
Filed Nov. 24, 1925  2 Sheets-Sheet 2
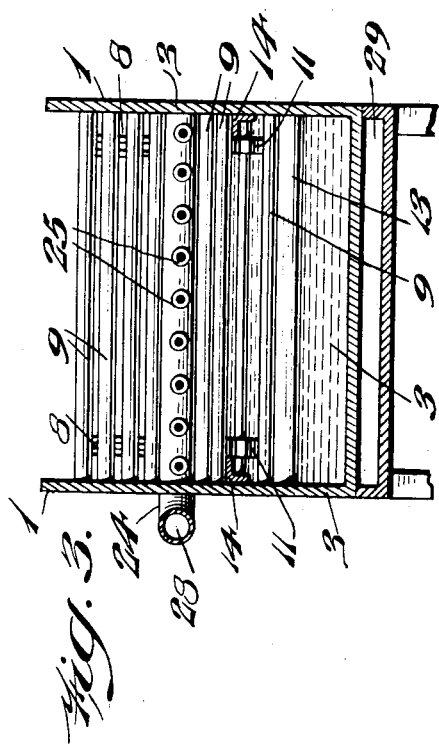
INVENTOR:
WILLIAM EHRHART,
BY
ATTORNEYS.

Patented Apr. 2, 1929.

1,707,786

UNITED STATES PATENT OFFICE.

WILLIAM EHRHART, OF LANCASTER, PENNSYLVANIA.

PRETZEL-COOKING APPARATUS.

Application filed November 24, 1925. Serial No. 71,053.

My invention relates to a novel construction of a pretzel cooking apparatus wherein I employ a suitable tank for containing the heated soda and water solution and provide novel means for circulating said solution from the front to the rear of the tank.

It further consists in a novel construction of a feeding apron or conveyor, which has a horizontal portion at the front of the tank, said horizontal conveyor being caused to incline forwardly and downwardly, and then terminating in an elongated horizontal portion, which extends through the major portion of the tank, said last mentioned horizontal portion being located in advance of a plurality of nozzles, whereby the heated soda and water solution is discharged into said tank above said last mentioned horizontal portion of said conveyor, so as to create a current in said tank flowing from the front to the rear thereof.

It further consists of a novel construction of a discharge apron or conveyor which extends for a portion of its length in an inclined plane from near the bottom of the tank and terminates in a horizontally disposed conveyor portion, said inclined and horizontal discharge conveyor being provided with fingers or studs, which extend from the inclined portion of the conveyor preferably at an acute angle, so as to stand vertical when they leave the solution, so as to engage the holes in the cooked pretzel and thereby carry the latter from the cooking devices.

It further consists of a novel construction of a tank which is provided at its lower portion with a steam jacket or other suitable heating means, causing the solution of soda and water to be heated, said tank being provided with a novel construction of feeding and discharge conveyors and novel means for causing the conveyor sections to assume the desired angle during their travel in the proper directions.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1, represents a longitudinal section, taken on the line 1—1 of Figure 2, of a pretzel cooking apparatus embodying my invention.

Figure 2, represents a top plan view of Figure 1.

Figure 3, represents a vertical section on line 3—3, Figure 1.

Similar numerals of reference indicate corresponding parts.

Referring to the drawings, 1 designates an elongated tank provided with the front and rear outwardly diverging walls 2 and the side walls 3, within which is contained the pretzel cooking heated solution of soda and water. Located at the front end of the tank 1 at the upper portion thereof is a shaft 4 provided with the sprocket wheel 5. In a plane below the shaft 4 and toward the opposite end of the tank 1, is another shaft 6 provided with the sprocket wheel 7 and over said sprocket wheels 5 and 7, travels an endless apron or feed conveyor comprising the sprocket chains 8 connecting which are a plurality of horizontally arranged bars 9. This feed conveyor travels initially horizontally toward the right of Figure 1 for a predetermined distance and thence travels at an inclination toward bottom of the tank 1 and thereafter moves horizontally toward the right of Figure 1 and thence travels rearwardly. In order to direct the sprocket chain in the proper planes, idler sprockets 10 and 11 and rollers 12 and 13 are provided to maintain the conveyor in proper position during its retrograde movement. Between the sprocket chains there are provided horizontally disposed guide tracks 14, each terminating in an inclined track portion 15, which tracks maintain the feed conveyor in proper position in its forward movement. 16 designates a shaft below the shaft 6 on which is arranged a sprocket wheel 17. The shaft 16 is driven from shaft 6 through the intervention of any suitable driving connection as the chain 18$^x$. 18 designates a shaft at the extreme right hand end of the tank 1, which is provided with the sprocket wheels 19. The discharge apron or conveyor comprises a pair of sprocket chains 20, which travel over the sprocket wheels 17 and 19 first upwardly in an inclined direction and thence horizontally as will be understood from the right hand portion of Figure 1. The side sprocket chains 20 are connected by means of transverse bars 21 which carry a plurality of studs or fingers 22 arranged in spaced or staggered relation as will be understood from the right hand portion of Figure 2, said studs projecting at acute angles from the inclined portion of the sprocket chains, so that they stand vertical or upright as the inclined portion of the discharge apron or conveyor advances, whereby said studs 22 are caused to engage the holes in the cooked pretzels 23, as the latter become cooked and float to the surface of the solution at the right hand portion of the tank into the path of the upwardly moving studs 22. 24 designates a pipe horizontally disposed which is transversely arranged near the front of the tank above the feed conveyor and is provided with a plurality of horizontally or laterally disposed nozzles 25, which cause the egress of the heated solution in a direction corresponding to the forward movement of the feed conveyor and set up a gentle circulation of the solution towards the discharge end of the tank. 26 designates an outlet pipe leading from the rear portion of the tank 1 to the rotary or other pump 27 from which leads the discharge pipe 28, which connects with the transverse pipe 24 as will be understood from Figures 1 and 2. The pump 27 can be of any conventional type of reciprocating or rotary pump preferably the latter, and may be provided with suitable speed regulating devices, and it will be apparent that the flow of the heated soda and water solution will be from left to right so that a constant gentle current in the upper portion of the soda and water solution is created by the discharge of the solution through the nozzles 25. The tank 2 can be heated by any suitable means, and in Figs. 1 and 3, I have shown the heating chamber or steam jacket 29 employed as the heating medium, into which steam may be introduced through the valved pipe 30 seen at the left hand portion of Figure 1. By this means the commingled soda and water solution 3 is always kept heated to the proper temperature which is desirable in a cooking apparatus of this character. The feed or discharge conveyor can be operated from any suitable point or by any suitable prime motor, and in Figure 2, I have shown the shaft 6 as provided with tight and loose pulleys 31 and 32 to which power may be applied. It will be apparent that when the tight pulley 31 is rotated by a belt or other means, the shaft 6 will be revolved thereby actuating the feed conveyor and through the medium of the chain 18ˣ, the discharge conveyor will be caused to travel in unison therewith in the desired direction, it being understood that said conveyors travel slowly through the solution in order that the pretzels may become properly cooked to the desired extent. The operation is as follows:—The pretzels having been formed into any conventional shape, are placed upon the left hand horizontal portion of the feed conveyor, which travels slowly through the soda and water solution. The tendency of the uncooked pretzels is to pass below the pipe 24 and initially to be submerged in the solution. As they travel slowly to the right during the cooking operation, they tend to rise as they become cooked to the surface of the solution and when fully cooked they float upon the surface of the solution towards the discharge conveyor so that when they reach the extreme right hand portion of the tank 1, they float upon the surface of the solution and by the time they are cooked, one or the other of the upright studs 22 engages the hole in the cooked pretzel and carries it forwardly to the right of the machine. It will be understood that the travel of the feed and discharge conveyors is very slow since the pretzels to be properly cooked must be submerged in and subjected to the action of the hot solution in the tank, to the desired extent. The studs 22 upon the inclined top portion of the discharge conveyor stand vertical and engage the openings in the pretzels as the latter float thereupon, said studs being long enough to engage the hole in a floating pretzel, it being apparent that the discharge conveyor is positioned at such an angle, that any cooked pretzel which does not engage a stud 22, slides back towards the solution so as to be engaged by any other of the advancing studs 22, arranged in staggered position. The rotary pump 27 can be adjusted or regulated, so as to control the period of time for cooking the pretzels. The feed and discharge conveyors are operated in unison, and it will be apparent that the initial impulse given to each pretzel by the feeding apron is augmented by the current created in the upper portion of the heated solution by the discharge of the latter through the nozzles 25, which are preferably located at or just below the surface of the solution.

Having thus described my invention what I claim as new and desire to secure by Letters Patent, is:—

1. In a device of the character stated, a tank arranged to contain a heated solution of soda and water, means for conveying uncooked pretzels into said tank, including an endless conveyor having horizontal runs arranged to travel in different planes and an inclined run, a discharge conveyor having an inclined run and a horizontally arranged run for pretzel delivery, and a series of nozzles located in proximity to the inclined run of the feeding device for creating a current in said solution for assisting in flotation of the pretzels.

2. In a device of the character stated, a tank arranged to contain a heated solution of soda and water, means for conveying uncooked pretzels into said tank, comprising an endless conveyor having horizontal runs arranged to travel in different planes and an inclined run, a discharge conveyor having an inclined run and a horizontally arranged run for pretzel delivery, studs on said discharge conveyor adapted to stand upright, and a series of nozzles located in proximity to the inclined run of the feeding device for creating a current in said solution for assisting in flotation of the pretzels.

3. In a device of the character stated, a tank adapted to contain a heated solution of soda and water, a pretzel feeding device for conveying uncooked pretzels into said tank comprising a conveyor composed of horizontal portions positioned at different levels and joined by an inclined portion, an upwardly inclined discharge conveyor for the cooked pretzels having the lower portion thereof submerged in said solution and terminating in a front horizontal portion, and upright studs on said inclined discharge conveyor for engaging the holes in the cooked pretzels to convey the latter from said tank, in combination with means for propelling said pretzels during cooking towards said studs, said means comprising nozzles arranged in front of said first named inclined conveyor portion and arranged to cause flotation of said pretzels.

4. In a device of the character stated, a tank adapted to contain a heated solution of soda and water, a pretzel feeding device for conveying uncooked pretzels into said tank comprising a conveyor composed of horizontal portions positioned at different levels and joined by an inclined portion, an inclined discharge conveyor for the cooked pretzels having the lower portion thereof submerged in said solution and terminating in a front horizontal portion, upright studs on the inclined portion of said discharge conveyor for engaging the holes in cooked pretzels to convey them from said tank, a transversely arranged pipe in the forward portion of said tank in proximity to said first named inclined conveyor portion having a plurality of horizontally disposed current creating nozzles discharging towards the rear of said tank for assisting in cooked pretzel flotation, and a solution circulating device having one end communicating with the rear end of said tank and the other end communicating with said nozzles.

5. In a device of the character stated, a tank adapted to contain a heated solution of soda and water, a pretzel feeding device for conveying uncooked pretzels into said tank comprising a conveyor composed of horizontal portions positioned at different levels and joined by an inclined portion, an inclined discharge conveyor having the lower portion thereof submerged in said solution and terminating in a front horizontal portion, upright studs arranged in staggered order on said discharge conveyor for engaging holes in cooked pretzels to convey them from said tank, a steam jacket at the bottom of said tank for heating the latter, and means for causing flotation of cooked pretzels in a direction towards said discharge conveyor.

6. In a device of the character stated, a tank adapted to contain a heated solution of soda and water, a pretzel feeding device for conveying uncooked pretzels into said tank comprising a conveyor composed of horizontal portions positioned at different levels and joined by an inclined portion, an inclined discharge conveyor having the lower portion thereof submerged in said solution and terminating in a front horizontal portion, upright studs on said discharge conveyor for engaging holes in cooked pretzels to convey them from said tank, a transverse pipe in the forward portion of said tank having a plurality of nozzles discharging towards the rear of said tank to assist in pretzel flotation, a solution circulating device having one end communicating with the rear end of said tank and the other end communicating with said nozzles, and a steam jacket at the bottom of the tank for heating the latter.

7. In a device of the character stated, a tank adapted to contain a heated solution of soda and water, a pretzel feeding device for conveying uncooked pretzels into said tank, comprising a horizontally disposed portion, and an inclined portion merging into a horizontally disposed portion extending longitudinally of said tank, a discharge conveyor comprising an upwardly inclined portion, terminating in a horizontally disposed portion, studs on said discharge conveyor adapted to stand upright on the inclined portion of said discharge conveyor and to engage holes in cooked pretzels to propel them from said tank, a series of nozzles located in proximity to the inclined portion of the pretzel feeding device, and a connection from the rear of said tank to said nozzles for creating a current in said solution.

WILLIAM EHRHART.